(12) United States Patent
Maddelein et al.

(10) Patent No.: US 8,517,471 B2
(45) Date of Patent: Aug. 27, 2013

(54) SEAT ASSEMBLY HAVING A MOVEABLE HEAD RESTRAINT

(75) Inventors: Michael Maddelein, Northville, MI (US); Karsten Mueller, Ingolstadt (DE); Bernd Rolf Schwerma, Neuberg (DE)

(73) Assignee: Lear Corporation, Southfield, MI (US)

( * ) Notice: Subject to any disclaimer, the term of this patent is extended or adjusted under 35 U.S.C. 154(b) by 149 days.

(21) Appl. No.: 12/879,256

(22) Filed: Sep. 10, 2010

(65) Prior Publication Data
US 2011/0109143 A1 May 12, 2011

(30) Foreign Application Priority Data
Nov. 12, 2009 (DE) .......................... 10 2009 046 660

(51) Int. Cl.
*B60N 2/48* (2006.01)

(52) U.S. Cl.
USPC ......................................................... 297/410

(58) Field of Classification Search
USPC ......................................................... 297/410
See application file for complete search history.

(56) References Cited

U.S. PATENT DOCUMENTS

| | | | |
|---|---|---|---|
| 4,265,482 A | 5/1981 | Nishimura et al. | |
| 4,674,797 A | 6/1987 | Tateyama | |
| 6,082,817 A | 7/2000 | Muller | |
| 6,390,558 B2 | 5/2002 | Fischer et al. | |
| 6,688,697 B2 | 2/2004 | Baumann et al. | |
| 6,715,829 B2 | 4/2004 | Svantesson et al. | |
| 6,767,064 B2 | 7/2004 | Veine et al. | |
| 6,805,411 B2 | 10/2004 | Gramss et al. | |
| 6,899,395 B2 | 5/2005 | Yetukuri et al. | |
| 7,048,336 B2 | 5/2006 | Mawbey et al. | |
| 7,070,235 B2 | 7/2006 | Schilling et al. | |
| 7,073,863 B1 | 7/2006 | Low et al. | |
| 7,111,901 B2 | 9/2006 | Schlierf et al. | |
| 7,137,668 B2 | 11/2006 | Kreitler | |
| 7,195,313 B2 | 3/2007 | Hippel et al. | |
| 7,232,187 B1 | 6/2007 | Sundararajan et al. | |
| 7,306,287 B2 * | 12/2007 | Linardi et al. | 297/410 |
| 7,758,127 B2 * | 7/2010 | Bokelmann et al. | 297/410 |
| 7,871,129 B2 * | 1/2011 | Boes et al. | 297/410 X |
| 7,878,597 B2 * | 2/2011 | Bokelmann et al. | 297/410 |
| 8,066,331 B2 * | 11/2011 | Boes | 297/410 |
| 8,297,705 B2 * | 10/2012 | Brunner et al. | 297/410 |
| 8,303,038 B2 * | 11/2012 | Smith | 297/410 X |
| 8,303,039 B2 * | 11/2012 | Mueller et al. | 297/410 |
| 8,376,465 B2 * | 2/2013 | Veine et al. | 297/410 |
| 8,408,645 B2 * | 4/2013 | Alexander et al. | 297/410 X |

(Continued)

FOREIGN PATENT DOCUMENTS

| | | | |
|---|---|---|---|
| DE | 102004005695 A1 | 8/2004 | |
| DE | 102006015785 A1 | 10/2006 | |

(Continued)

OTHER PUBLICATIONS

German Patent and Trademark Office, Office Action for the corresponding German Patent Application No. 10 2009 046 660.6-16 mailed May 6, 2010.

*Primary Examiner* — Rodney B White
(74) *Attorney, Agent, or Firm* — Brooks Kushman P.C.

(57) ABSTRACT

A seat assembly having a moveable headrest assembly disposed on a support post. The headrest assembly has a latching mechanism configured to engage the support post to inhibit movement of the headrest assembly in a first direction.

20 Claims, 6 Drawing Sheets

(56) References Cited

U.S. PATENT DOCUMENTS

| | | |
|---|---|---|
| 2001/0028191 A1 | 10/2001 | Lance |
| 2001/0040396 A1 | 11/2001 | Kreuels et al. |
| 2004/0195894 A1 | 10/2004 | Pal et al. |
| 2005/0077762 A1 | 4/2005 | Kraemer et al. |
| 2005/0116515 A1 | 6/2005 | Schlierf et al. |
| 2006/0071518 A1 | 4/2006 | Hippel et al. |
| 2006/0226688 A1 | 10/2006 | Terada et al. |
| 2006/0250017 A1 * | 11/2006 | Otto et al. .................... 297/410 |
| 2007/0216211 A1 | 9/2007 | Mori |
| 2009/0058162 A1 | 3/2009 | Boes et al. |
| 2009/0146479 A1 | 6/2009 | Boes et al. |

FOREIGN PATENT DOCUMENTS

| | | |
|---|---|---|
| DE | 102007034961 A1 | 4/2008 |
| FR | 2852066 A1 | 9/2004 |
| GB | 2340744 A | 3/2000 |
| WO | 2004089688 A1 | 10/2004 |
| WO | 2007073034 A1 | 6/2007 |

* cited by examiner

SEAT ASSEMBLY HAVING A MOVEABLE HEAD RESTRAINT

CROSS-REFERENCE TO RELATED APPLICATIONS

This application claims foreign priority benefits under 35 U.S.C. §119(a)-(d) to DE 10 2009 046 660.6, filed Nov. 12, 2009, which is hereby incorporated by reference in its entirety.

BACKGROUND OF THE INVENTION

Field of the Invention

The present invention relates to a seat assembly having a moveable head restraint.

SUMMARY OF THE INVENTION

In at least one embodiment a seat assembly is provided. The seat assembly may include a seat back having a support post and a headrest assembly disposed on the support post. The headrest assembly includes a housing, a mounting unit, and a latching mechanism. The mounting unit is fixedly disposed on the support post and has a latching mechanism opening. The latching mechanism is configured to slide within the latching mechanism opening. The latching mechanism is configured to engage the support post to inhibit movement of the headrest assembly in a first direction.

In at least one embodiment a seat assembly is provided. The seat assembly has a support post having an engagement feature and a headrest assembly disposed on the support post. The headrest assembly includes a housing and a latching mechanism disposed in the housing. The latching mechanism has a frame and an engagement member. The frame is moveable with respect to the support post. The engagement member is moveable with respect to the frame. Movement of the housing is inhibited when the engagement member engages the engagement feature.

In at least one embodiment a seat assembly is provided. The seat assembly includes a support post having an engagement feature and a headrest assembly moveably disposed on the support post. The headrest assembly has a housing and a latching mechanism mounted to the housing. The latching mechanism has an engagement member that selectively engages the support post. Movement of the housing away from a head of a seat occupant is inhibited when the engagement member engages the engagement feature. Movement of the housing toward the head of a seat occupant is permitted when the engagement member contacts the support post and a sufficient actuation force is applied to the headrest assembly.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. In addition, any or all features from one embodiment may be combined with any other embodiment. Therefore, specific structural and functional details disclosed herein are not to be interpreted as limiting, but merely as a representative basis for the claims and/or as a representative basis for teaching one skilled in the art to variously employ the present invention.

Figure 1:
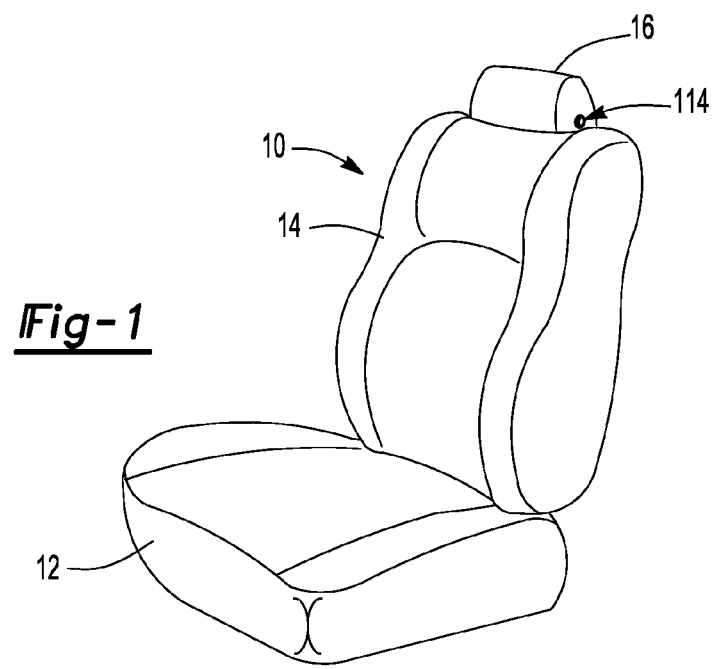
FIG. 1 is a perspective view of a seat assembly having a moveable head restraint.

Referring to FIG. 1, an exemplary seat assembly 10 is shown. The seat assembly 10 may be configured for use in a vehicle, such as a motor vehicle like a car or truck.

The seat assembly 10 may include a seat bottom 12 and a seat back 14. In a vehicular application, the seat bottom 12 may be configured to be mounted on a support surface, such as a floor pan of a vehicle. The seat bottom 12 may be configured to support a seat occupant. The seat back 14 may be pivotally disposed on the seat bottom 12 and may include a head restraint assembly 16. The seat back 14 may be configured to support the back of a seat occupant.

Figure 2:
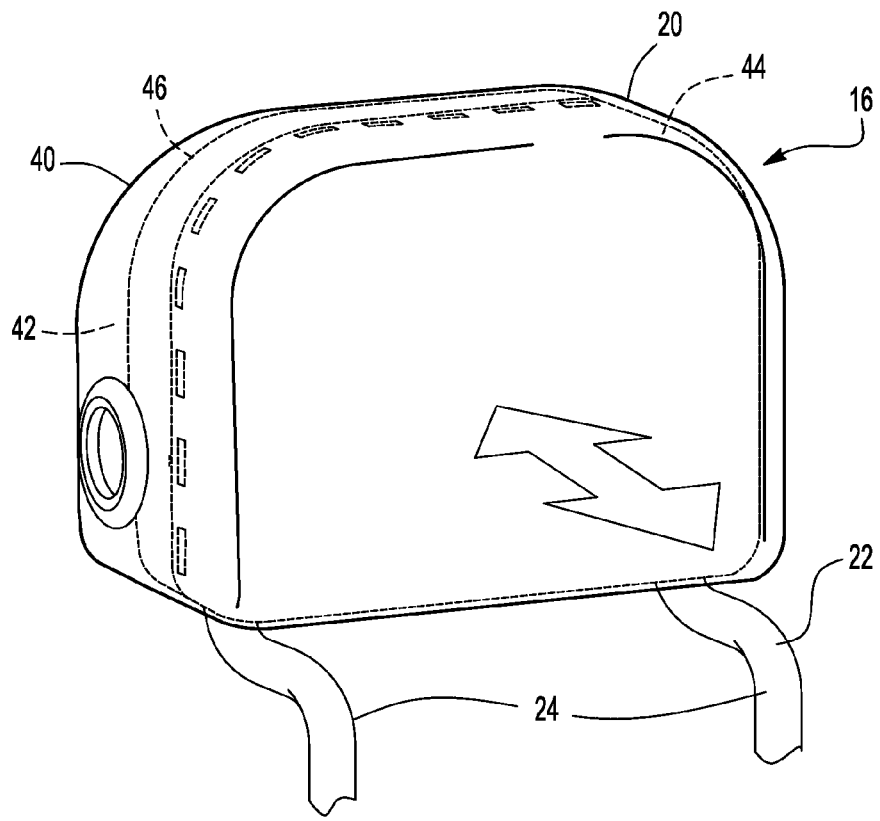
FIG. 2 is a perspective view of the moveable head restraint having a headrest assembly.
Figure 3:
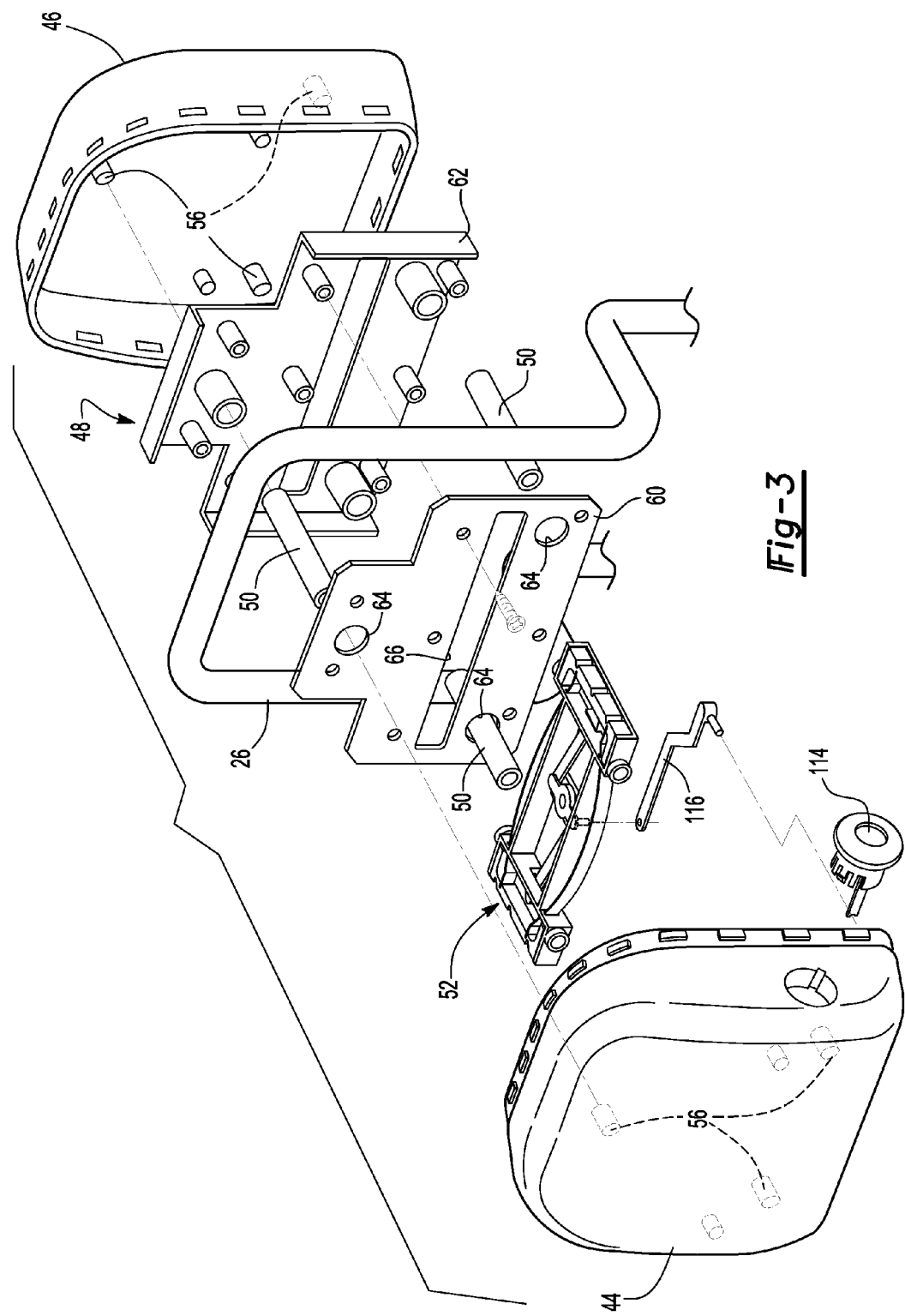
FIG. 3 is an exploded perspective view of the headrest assembly.

Referring to FIGS. 2 and 3, the head restraint assembly 16 may include a headrest assembly 20 and one or more support posts 22. The headrest assembly 20 may be moveably disposed on the support posts 22 as will be described in more detail below. The support posts 22 may be disposed on the seat back 14 and may be made of any suitable material or materials, such as a metal or metal alloy. The support posts 22 may include a lower portion 24 and an upper portion 26.

The lower portion 24 may extend through the top of the seat back 14. In addition, the lower portion 24 may be fixedly mounted to a structural frame of the seat back 14 such that the support posts 22 do not move with respect to the seat back 14. Alternatively, the lower portion 24 may move with respect to the seat back 14 in one or more embodiments. For instance, the lower portion 24 may be disposed in a guide sleeve that may be disposed on the frame of the seat back 14 or may be part of an active head restraint system that is configured to move in response to a load force or vehicle impact event.

The upper portion 26 may or may not be coaxially disposed with the lower portion 24. In addition, the upper portion 26 may be integrally formed with the lower portion 24. In the embodiment shown in FIG. 3, the upper portion 26 is generally U-shaped and extends between two lower portions 24 of the support post 22.

Figure 6:
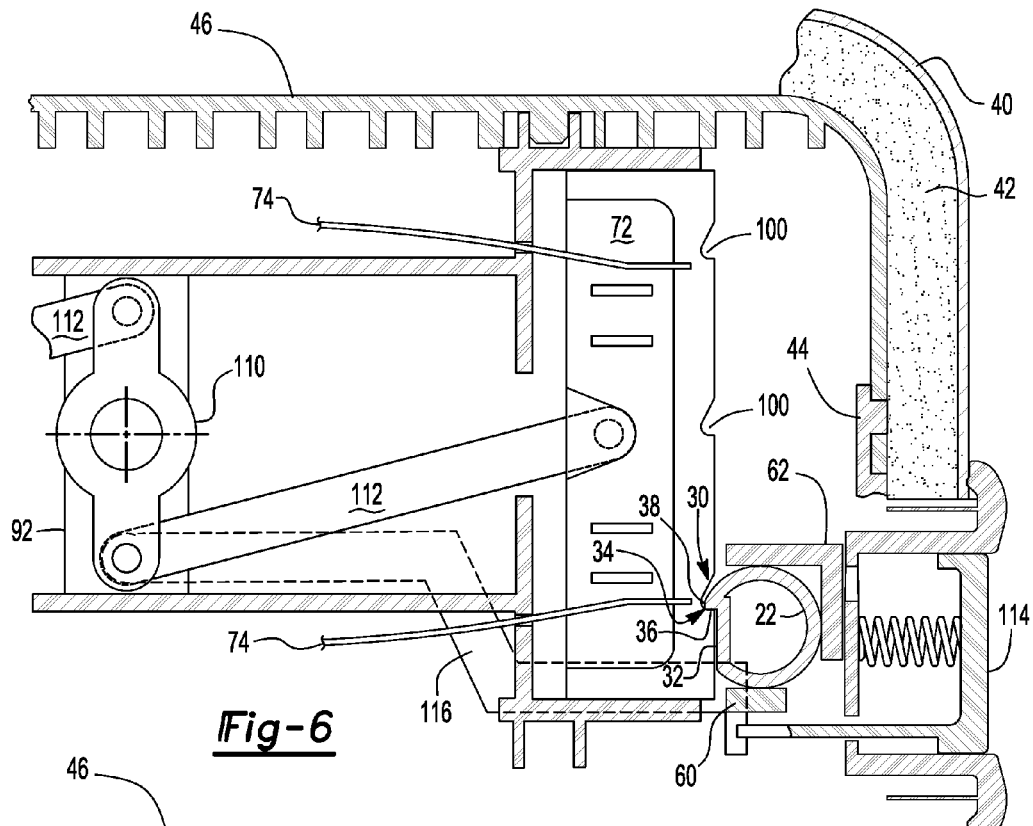
FIG. 6 is a top section view of the moveable head restraint showing the headrest assembly in a first position and the latching mechanism engaging the support post.

The upper portion 26 may include one or more engagement features 30. An exemplary engagement feature 30 is best shown in FIG. 6. An engagement feature 30 may have any suitable configuration. For instance, the engagement feature 30 may have a male configuration, a female configuration, or combinations thereof. In the embodiment shown, the engagement feature 30 includes a flat 32 and a protrusion 34 disposed adjacent to the flat 32. The protrusion 34 may include a first surface 36 that inhibits movement of the headrest assembly 20 and a second surface 38 that facilitates movement of the headrest assembly 20 when a sufficient actuation force is provided. For instance, the second surface 38 may be an angled or curved surface that permits ratchet-like movement as will be discussed in more detail below. The upper portion 26 may include multiple engagement members 30. For instance, corresponding engagement features 30 may be disposed generally opposite each other on areas of the upper portion 26 that extend toward lower portions 24.

Referring to FIGS. 2 and 3, the headrest assembly 20 may be configured to support the head of an occupant of the seat assembly 10. The headrest assembly 20 may be generally disposed above the seat back 14 and may include a trim cover 40, a cushion 42, a first housing 44, a second housing 46, a mounting unit 48, one or more sleeves 50, and a latching mechanism 52.

The trim cover 40 may cover at least a portion of a visible exterior surface of the headrest assembly 20. The trim cover 40 may be made of any suitable material or materials, such as a fabric, vinyl, leather, or the like. The trim cover 40 may cover the cushion 42, which may be disposed under at least a portion of the trim cover 40.

The first and second housings 44, 46 may be disposed under the trim cover 40 and/or cushion 42. The first and second housings 44, 46 may be made of any suitable material or materials, such as a polymeric material. The first and second housings 44, 46 may each have openings that face toward each other and cooperate to define a cavity that at least partially receives the mounting unit 48, sleeves 50, and latching mechanism 52. The first and second housings 44, 46 may be fastened or connected to each other in any suitable manner. For instance, the first and second housings 44, 46 may snap fit together using one or more locking tabs that engage corresponding slots on another housing.

The first and second housings 44, 46 may also include one or more sleeve engagement features 56 that engage an end of a sleeve 50. A sleeve engagement feature 56 may have any suitable configuration. For instance, a sleeve engagement feature 56 may have a male configuration that fits inside a sleeve 50, a female configuration that may be disposed outside the sleeve 50, or combinations thereof.

The mounting unit 48 may be fixedly disposed on the support post 22. The mounting unit 48 may be provided as a single component or as multiple components. For instance, the mounting unit 48 may include a first mounting plate 60 and a second mounting plate 62 that may be attached or fastened to each other in any suitable manner, such as with one or more fasteners or interlocking features. In addition, the first and second mounting plates 60, 62 may be provided as a unitary structure in one or more embodiments. The mounting unit 48 may include one or more sleeve openings 64 and a latching mechanism opening 66.

A sleeve opening 64 may be provided in the first and/or second mounting plates 60, 62. In FIG. 3, three sets of sleeve openings 64 are shown. A sleeve opening 64 may receive a sleeve 50 and permit movement of the sleeve 50 through the sleeve opening 64. The sleeve openings 64 may be generally disposed inside an area defined by the upper portion 26 of the support post 22 to provide a compact headrest assembly 20.

The latching mechanism opening 66 may also be provided in the mounting unit 48. The latching mechanism opening 66 may receive the latching mechanism 52 and facilitate movement of the latching mechanism 52 through or with respect to the latching mechanism opening 66.

One or more sleeves 50 may cooperate with the mounting unit 48 to help guide movement of the headrest assembly 20. In the embodiment shown, three sleeves 50 are provided. Each sleeve 50 may have a first end that may engage the first housing 44 and a second end disposed opposite the first end that may engage the second housing 46. The sleeves 50 may engage sleeve engagement features 56 on the first and second housings 44, 46 such that the first and second housings 44, 46 and sleeves 50 may move together.

Figure 4:
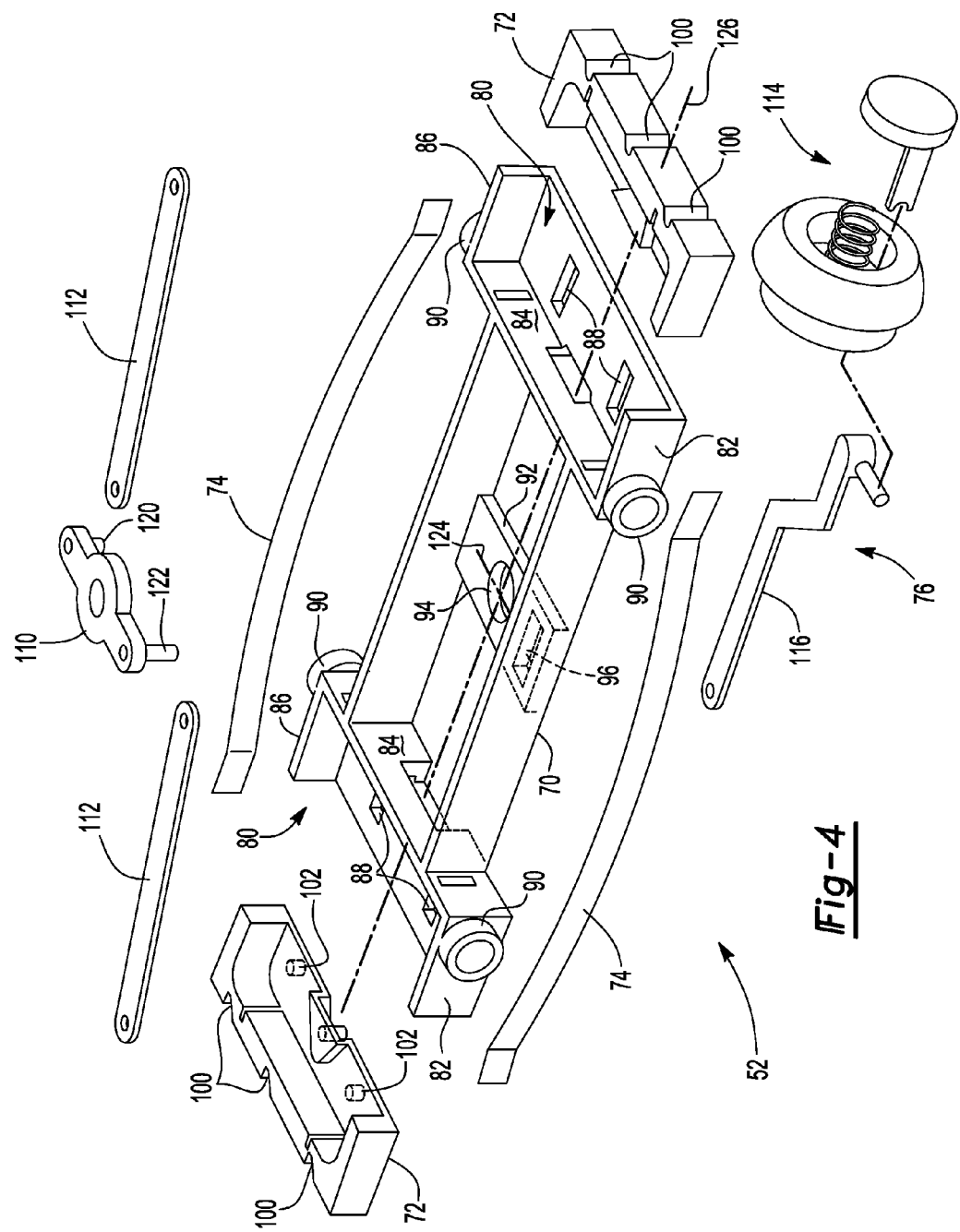
FIG. 4 is an exploded view of a latching mechanism of the headrest assembly.
Figure 5:
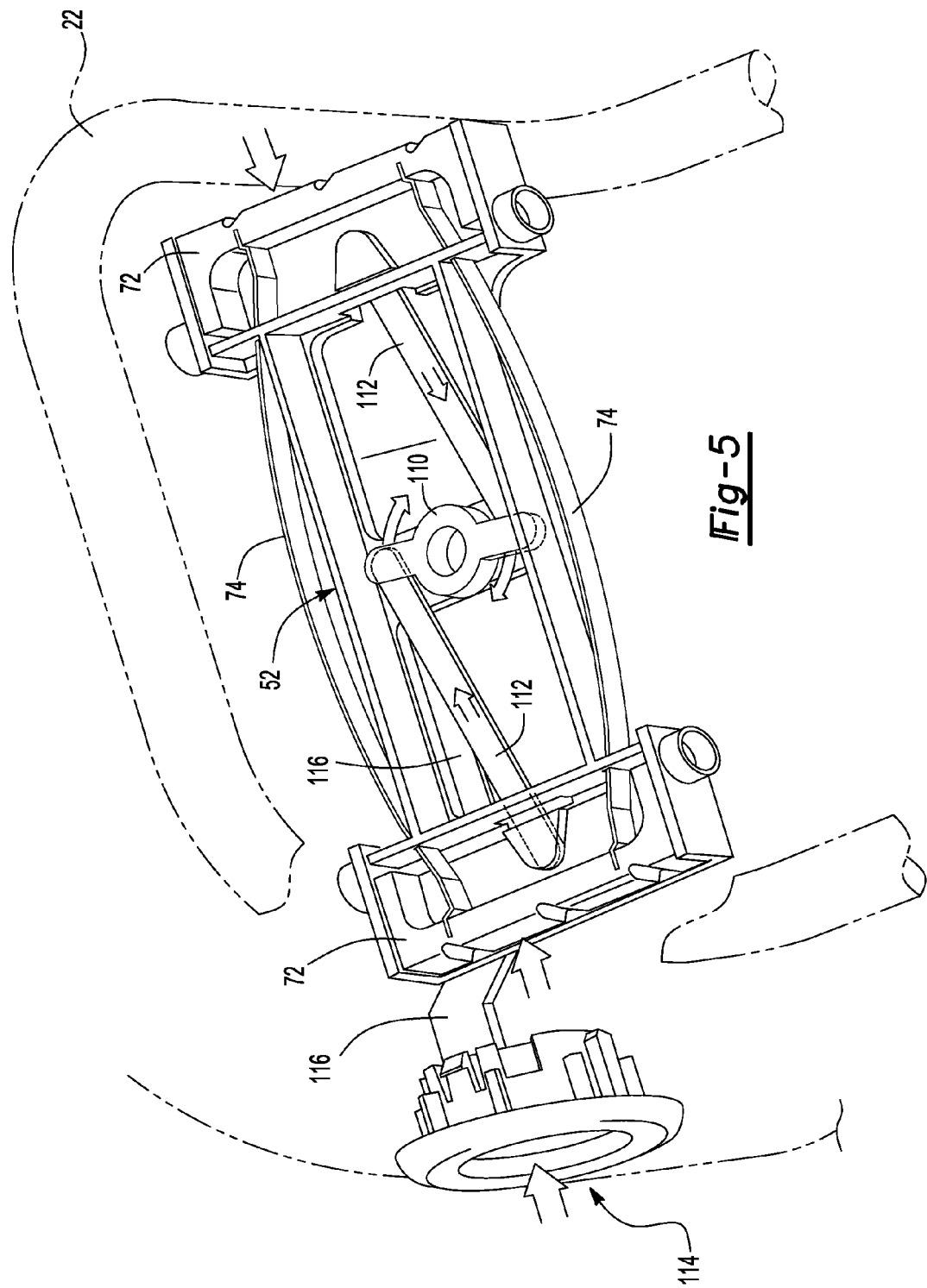
FIG. 5 is a fragmentary perspective view of a portion of the moveable head restraint showing the latching mechanism and a support post.

Referring to FIGS. 3-5, an embodiment of a latching mechanism 52 is shown. The latching mechanism 52 may include a frame 70, one or more engagement members 72, one or more biasing members 74, and an actuator assembly 76.

The frame 70 may be configured to be moveably positioned with respect to the latching mechanism opening 66. The frame 70 may have any suitable configuration and may be made of any suitable material, such as a polymeric material.

The frame 70 may include one or more engagement member cavities 80 that receive and guide movement of an engagement member 72. In at least one embodiment, two engagement member cavities 80 provided at opposing ends of the frame 70. An engagement member cavity 80 may be at least partially defined by one or more walls, such as first, second, and third walls 82, 84, 86, and may generally be open in a direction extending toward the support post 22.

One or more guide slots 88 may be provided with the frame 70 that may help position and guide movement of an engagement member 72. A guide slot 88 may be disposed proximate an engagement member cavity 80. In at least one embodiment, a pair of guide slots 88 is provided with each engagement member cavity 80.

One or more housing engagement features 90 may be provided with the frame 70 for engaging the first and/or second housings 44, 46. The housing engagement features 90 may have any suitable configuration. For instance, a housing engagement feature 90 may have a male configuration, a female configuration, or combinations thereof. In the embodiment shown, a pair of housing engagement features 90 is provided on opposite sides of the frame 70. The housing engagement features 90 may be omitted in one or more embodiments, but the frame 70 may still contact the first and/or second housings 44, 46

A mounting member 92 may be provided with the frame 70 for receiving a portion of the actuator assembly 76. In the embodiment shown, the mounting member 92 is disposed between and spaced apart from the engagement member cavities 80. The mounting member 92 may include a first opening 94 and a second opening 96 that receive a portion of the actuator assembly 76 as will be discussed in more detail below.

One or more engagement members 72 may be moveably disposed in the frame 70. More specifically, an engagement member 72 may be at least partially disposed in an engagement member cavity 80 and may be configured to move toward or away from the support post 22. The engagement member 72 may include a plurality of support post engagement features 100. The support post engagement features 100 may be spaced apart from each other to provide a plurality of discrete positions in which the headrest assembly 20 may be positioned. Any suitable number of support post engagement features 100 may be provided. In the embodiment shown, three support post engagement features 100 are provided. A support post engagement features 100 may engage or mate with an engagement feature 30 on the support post 22 to inhibit movement of the headrest assembly 20 in at least one direction and may be spaced apart from the support post 22 to permit movement. A support post engagement feature 100 may be configured to mate with or have a similar shape as engagement feature 30.

The engagement member 72 may also include one or more guide features 102 that are disposed in a corresponding guide slot 88 in the frame 70 to help guide and/or limit the range of movement of the engagement member 72 between an advanced position and a retracted position as will be discussed in more detail below. For instance, a guide feature 102 may be disposed near a first end of a guide slot 88 in the advanced position and may be disposed near an opposite end of the guide slot 88 in the retracted position.

One or more biasing members 74 may be provided to exert a biasing force on one or more engagement members 72. For instance, the biasing members 74 may bias an engagement member 72 toward the support post 22. In the embodiment shown, a pair of biasing members 74 is provided. The biasing members 74 may have any suitable configuration. The biasing members 74 may be configured as leaf springs that may extend between a pair of engagement members 72. More specifically, the biasing members 74 may have a first and second ends that are disposed opposite each other and received by different engagement members 72 to bias both engagement members 72. A biasing member 74 may extend through a slot in the second wall 84.

The actuator assembly 76 may be configured to provide an actuation force that actuates one or more engagement members 72. For example, the actuator assembly 76 may be configured to transmit force to overcome the biasing force of the biasing members 74 to retract an engagement member 72 away from the support post 22. The actuator assembly 76 may have any suitable configuration. In at least one embodiment, the actuator assembly 76 may include a pivot member 110, one or more engagement member links 112, an input device 114, and an input device link 116.

The pivot member 110 may be pivotally or rotatably disposed on the latching mechanism 52. For instance, the pivot member 110 may be received by first opening 94 of the mounting member 92. The pivot member 110 may include one or more engagement link mounting features 120 and an input device link mounting feature 122. In the embodiment shown, two engagement link mounting features 120 are provided on opposite sides of the pivot member 110. The input device link mounting feature 122 may extend at least partially through the second opening 96 in the mounting member 92.

An engagement member link 112 may couple the pivot member 110 to an engagement member 72. For instance, a first end of an engagement member link 112 may engage the pivot member 110 and a second end disposed opposite the first end may engage the engagement member 72. The engagement member link 112 may be coupled such that it can rotate with respect to the pivot member 110 and/or engagement member 72. For example, the ends of the engagement member link 112 may be configured with openings or holes that may receive and rotate with respect to pins on the pivot member 110 and engagement member 72. Alternatively, a pin may be provided on one or more ends of the engagement member link 112 that are received in the pivot member 110 and/or engagement member 72. The engagement member link 112 may extend through an opening disposed proximate the second wall 84 of the frame 72 in one or more embodiments.

The input device 114 may be configured to receive an actuation force or signal indicative of a request to release the headrest assembly 20. In at least one embodiment, the input device 114 may receive and transmit an actuation force to the pivot member 110. The input device 114 may have any suitable configuration. For instance, the input device 114 may be configured as a button that may transmit force exerted by a user. The input device 114 may be disposed in any suitable location. In at least one embodiment, the input device 114 may be disposed on the headrest assembly 20. Alternatively, the input device 114 may be disposed remotely from the headrest assembly 20 in other embodiments, such as an embodiment that does not transmit force exerted by a user to release the headrest assembly 20. For instance, the input device 114 may be a switch or other electrical or electromechanical device that generates a signal that may be used to control or operate an actuator, such as a motor, solenoid, or the like, that exerts a force to actuate one or more engagement members 72.

The input device link 116 may couple the input device 114 to the pivot member 110. For instance, the input device link 116 may include a first end that is coupled to the input device 114 and a second end that may be coupled to the pivot member 110. The input device link 116 may extend through an opening in the first and/or second housings 44, 46. The input device link 116 may be disposed near the second opening 96 in the mounting member 92 or may extend at least partially into the second opening 96 in one or more embodiments.

Figure 7:
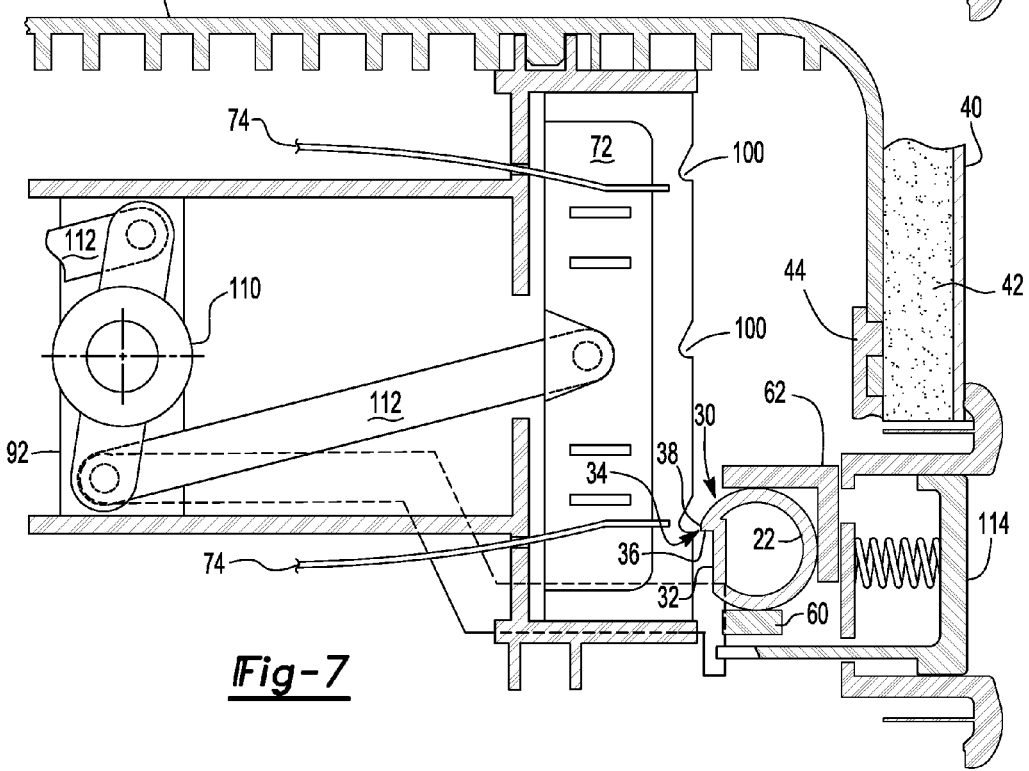
FIG. 7 is a section view of the moveable head restraint showing the headrest assembly in the first position with the latching mechanism disengaged from the support post.
Figure 8:
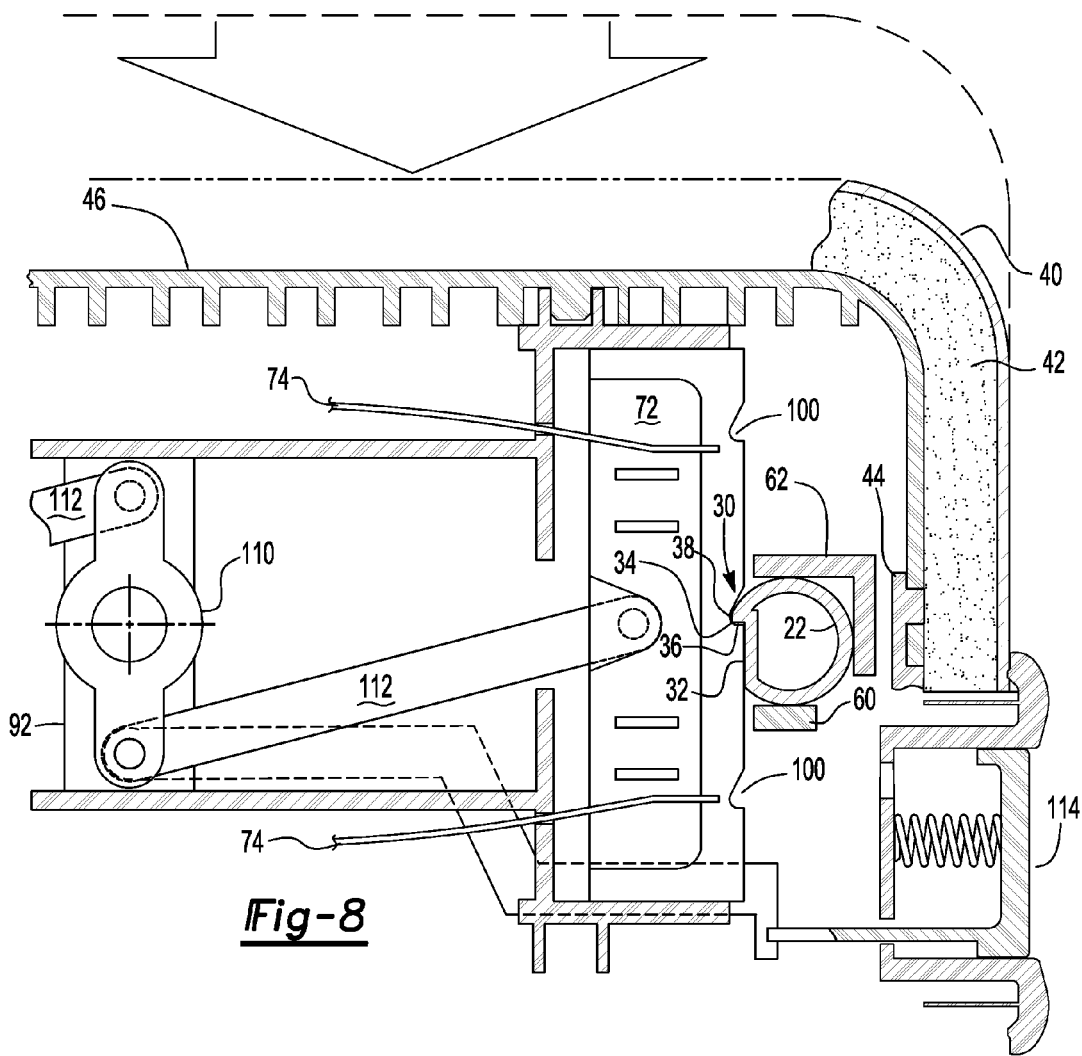
FIG. 8 is a section view of the moveable head restraint disposed in a second position with the latching mechanism disengaged from the support post.

Referring to FIGS. 5-8, operation of the head restraint assembly 16 will be described in greater detail. For clarity, FIGS. 6-8 illustrate a single engagement member 72, but similar operation may be employed for additional engagement members 72. The head restraint assembly 16 may be configured such that the headrest assembly 20 may move in two manners. First, the headrest assembly 20 may be inhibited from moving in a first direction unless the engagement member 72 is moved toward a retracted position. The first direction may be in a direction that extends generally away from a head of a seat occupant (e.g., from the bottom to the top of FIGS. 6-8).

The engagement member 72 may move from a first or advanced position to a second or retracted position to permit movement of the headrest assembly 20 in the first direction. The first direction may be generally along a first axis 124, which is shown in FIG. 3. Such movement of the latching mechanism 52 is shown starting with FIG. 6.

In FIG. 6, the engagement member 72 begins in the advanced position in which the engagement member 72 is biased into contact with the support post 22. A support post engagement feature 100 of the engagement member 72 may engage or contact an engagement feature 30 on the support post 22. As such, the engagement feature 30 and support post engagement feature 100 may cooperate to inhibit movement in the first direction.

Referring to FIG. 7, the engagement member 72 is shown in the retracted position in which the engagement member 72 is moved away from the support post 22. As such, the support post engagement feature 100 on the engagement member 72 may not engage an engagement feature 30 on the support post 22. As such, the engagement feature 30 and support post engagement feature 100 may not cooperate to inhibit movement in the first direction. Actuation of the engagement feature 72 may be accomplished through operation of the latching mechanism 52. For instance, actuation of the input device 114 may move the input device link 116, rotate the pivot member 110, move the engagement member links 112, and retract the engagement members 72. This direction of movement of these components is also indicated by the arrows in FIG. 5.

Referring to FIG. 8, the headrest assembly 20 is moved in the first direction with respect to FIGS. 6 and 7. As such the headrest assembly 20 may be located closer to the head of a seat occupant. More specifically, the headrest assembly 20 is illustrated such that a second support post engagement feature 100 on the engagement member 72 is disposed proximate the engagement feature 30 on the support post 22. As such, the headrest assembly 20 may move along the first axis 124 while the engagement member 72 moves along a second axis 126.

The engagement member 72 may or may not be held in the retracted position during movement in the first direction. For example, the engagement member 72 may be held in the retracted position and then released after the headrest assembly 20 is moved to a desired position to permit re-engagement with the support post 22. Alternatively, the engagement member 72 may be released to move toward the advanced position after the headrest assembly 20 has started to move to a different position. As such, a portion of the engagement member 72 between two support post engagement features 100 may contact and slide across the engagement feature 30 during movement between discrete locking positions. Contact of the engagement member 72 and engagement feature 30 during movement may be due to the biasing force exerted by the biasing member 74.

The headrest assembly 20 may be permitted to move along the first axis 124 in a second direction disposed opposite the first direction in a different manner that described above. For example, movement in the second direction may occur in response to a sufficient actuation force and without disengaging the latching mechanism 52 from the support post 22. The second direction may be in a direction that extends generally toward from a head of a seat occupant, or in a direction that extends from the top of the section views shown in FIGS. 6-8 toward the bottom of each section view.

Actuation in the second direction may occur in response to a sufficient actuation force provided to the headrest assembly 20. The actuation force may or may not be due to manually applied forces or intervention. For instance, a seat occupant may exert an actuation force on the headrest assembly 20 to move the headrest assembly 20 in the second direction by pulling the headrest assembly 20 closer to the head of the occupant. Alternatively, the headrest assembly 20 may be configured to move in response to inertial forces, such as may occur during a vehicle impact event.

Movement in the second direction may occur without moving the engagement member 72 with the actuator assembly 76. For instance, an actuation force in the second direction may cause the engagement member 72 to move out of engagement with the engagement feature 30 on the support post 22. The support post engagement feature 100 may slide along the second surface 38 of the engagement feature 30 and out of the engagement with the support post engagement feature 100 in a ratchet-like manner. The headrest assembly 20 may then be moved to a different position.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat assembly comprising:
a seat back having a support post; and
a headrest assembly disposed on the support post, the headrest assembly including:
a housing;
a mounting unit fixedly disposed on the support post within the housing such that the mounting unit does not move with respect to the support post, the mounting unit having a latching mechanism opening; and
a latching mechanism configured to slide within the latching mechanism opening, the latching mechanism being configured to engage the support post to inhibit movement of the headrest assembly in a first direction.

2. The seat assembly of claim 1 further comprising a sleeve disposed on the housing that is moveably disposed in a sleeve opening in the mounting unit.

3. The seat assembly of claim 1 wherein the latching mechanism further comprises an engagement member that moves between an advanced position in which the engagement member contacts the support post to inhibit movement of the headrest assembly and a retracted position in which the engagement member is spaced apart from the support post.

4. The seat assembly of claim 3 wherein the engagement member moves substantially perpendicular to the first direction between the advanced position and the retracted position.

5. The seat assembly of claim 3 wherein the engagement member includes a plurality of support post engagement features that are spaced apart from each other and configured to engage an engagement feature disposed on the support post.

6. The seat assembly of claim 3 further comprising a biasing member that exerts a biasing force to bias the engagement member toward the advanced position.

7. The seat assembly of claim 3 wherein the headrest assembly further comprises an actuator assembly having a pivot member and an engagement member link extending between the pivot member and the engagement member.

8. The seat assembly of claim 7 wherein the rotation of the pivot member actuates the engagement member.

9. The seat assembly of claim 7 wherein the actuator assembly further comprises an input device disposed on the headrest assembly and an input device link extending between the input device and the pivot member.

10. A seat assembly comprising:
a support post having an engagement feature; and
a headrest assembly disposed on the support post, the headrest assembly including:
a housing having a sleeve;
a mounting unit fixedly disposed on the support post within the housing, the mounting unit having a latching mechanism opening and a sleeve opening; and
a latching mechanism disposed in the latching mechanism opening, the latching mechanism having a frame that is moveable with respect to the support post and an engagement member that is moveable with respect to the frame;
wherein movement of the housing is inhibited when the engagement member engages the engagement feature.

11. The seat assembly of claim 10 wherein the frame is moveable along a first axis and the engagement member is moveable along a second axis that is substantially perpendicular to the first axis.

12. The seat assembly of claim 10 wherein frame includes first and second engagement member cavities that receive first and second engagement members.

13. The seat assembly of claim 12 further comprising a biasing member that extends between the first and second engagement members and biases the first and second engagement members toward the support post.

14. The seat assembly of claim 12 wherein the frame further comprises a mounting member disposed between the first and second engagement members.

15. The seat assembly of claim 14 further comprising a pivot member disposed on the mounting member, the pivot member being coupled to the first and second engagement members by first and second engagement member links, wherein the first and second engagement members move away from the support post when the pivot member is rotated in a first rotational direction and the first and second engagement members move toward the support post when the pivot member is rotated in a second rotational direction.

16. The seat assembly of claim 12 wherein the engagement member includes a guide feature disposed in a guide slot in the frame.

17. A seat assembly comprising:
a support post having an engagement feature; and
a headrest assembly moveably disposed on the support post, the headrest assembly including:
 a housing;
 a mounting unit fixedly disposed on the support post within the housing such that the mounting unit does not move with respect to the support post, the mounting unit having a latching mechanism opening; and
 a latching mechanism moveably disposed in the latching mechanism opening and mounted to the housing, the latching mechanism having an engagement member that selectively engages the support post;
wherein movement of the housing away from a head of a seat occupant is inhibited when the engagement member engages the engagement feature and movement of the housing toward the head of a seat occupant is permitted when the engagement member contacts the support post and a sufficient actuation force is applied to the headrest assembly.

18. The seat assembly of claim 17 wherein movement of the housing away from a head of a seat occupant is permitted when the engagement member disengages the engagement feature.

19. The seat assembly of claim 17 further comprising a second engagement member disposed on the latching mechanism opposite the engagement member.

20. The seat assembly of claim 17 wherein the housing includes front and rear portions that move together when the headrest assembly is actuated.

* * * * *